(12) United States Patent
Denzinger et al.

(10) Patent No.: US 7,723,545 B2
(45) Date of Patent: May 25, 2010

(54) METHOD FOR THE PRODUCTION OF FREE-FLOWING ADDITIVES

(75) Inventors: Steffen Denzinger, Mainz (DE); Frank Harréus, Weinheim (DE); Alexander Schmitt, Rödersheim-Gronau (DE)

(73) Assignee: Raschig GmbH, Ludwigshafen (DE)

( * ) Notice: Subject to any disclaimer, the term of this patent is extended or adjusted under 35 U.S.C. 154(b) by 0 days.

(21) Appl. No.: 12/256,748

(22) Filed: Oct. 23, 2008

(65) Prior Publication Data

US 2009/0112023 A1 Apr. 30, 2009

(30) Foreign Application Priority Data

Oct. 24, 2007 (DE) .................. 10 2007 051 115

(51) Int. Cl.
*C07C 267/00* (2006.01)

(52) U.S. Cl. ..................................... 564/252

(58) Field of Classification Search .................. 564/252
See application file for complete search history.

(56) References Cited

U.S. PATENT DOCUMENTS

| 2,853,473 A | 9/1958 | Campbell et al. |
| 3,502,722 A | 3/1970 | Neumann |
| 5,354,888 A | 10/1994 | Scholl |
| 6,069,204 A | 5/2000 | Stroud, Jr. et al. |
| 2006/0165981 A1 | 7/2006 | Martini et al. |
| 2007/0167633 A1 * | 7/2007 | Wershofen et al. .......... 548/202 |

FOREIGN PATENT DOCUMENTS

| DE | 1 156 401 | | 10/1963 |
| DE | 196 38 042 | A1 | 10/1997 |
| DE | 102 37 186 | A1 | 3/2004 |
| EP | 0 609 698 | B1 | 8/1994 |
| EP | 1 425 443 | B1 | 2/2006 |
| GB | 1 485 294 | | 9/1977 |
| JP | 2004-277931 | A | 10/1994 |
| JP | 2006-249152 | A | 9/2005 |
| WO | WO 03/010370 | A1 | 2/2003 |

OTHER PUBLICATIONS

Kirk-Othmer Enclyclopedia of Chemical Technology (1996), John Wiley & Sons, Inc., Powders, Handling, Bulk Properties, p. 19 (article posted online Dec. 4, 2000).*

* cited by examiner

*Primary Examiner*—Brian J Davis
(74) *Attorney, Agent, or Firm*—Paul D. Strain, Esq.; Fanelli Strain & Haag PLLC

(57) ABSTRACT

The present invention provides a method for the production of free-flowing additive compounds that comprises the steps of preparation of a particulate additive compound and storage of a mass of the particulate additive compound at a surface pressure of at least 30 g/cm$^2$ until the mass of additive compound is baked together. Then follows the crushing of the baked-together mass of the additive compound into a crushed particulate additive compound and the sieving of the crushed particulate additive compound, whereby particles of a size in excess of 4.0 mm and particles of a size of less than 0.1 mm are separated from the crushed particulate additive compound such that a fraction containing a free-flowing additive compound with long-term stability of particle sizes is obtained.

14 Claims, 4 Drawing Sheets

METHOD FOR THE PRODUCTION OF FREE-FLOWING ADDITIVES

CROSS-REFERENCE TO RELATED PATENT APPLICATIONS

The right of foreign priority is claimed under 35 U.S.C. §119(a) based on Federal Republic of Germany Application No. 10 2007 051 115.0, filed Oct. 24, 2007, the entire contents of which, including the specification, drawings, claims and abstract, are incorporated herein by reference.

BACKGROUND

The invention relates to a method for the production of free-flowing additives, and the additives that can be obtained with the method.

The production and use of additives, such as hydrolysis protection additives, is known in principle. Especially in the area of polyesters, stabilization against hydrolysis is required for very many application purposes.

Accordingly, U.S. Pat. No. 6,069,204 describes a monofiber made from a mixture of polyester and multivalent alcohol of a 1,4-cyclohexane dimethanol, a polyamide, and a polyolefine. For stabilization against hydrolysis, bis-(2,6-diisopropylphenyl)-carbodiimide, as well as other substances, can be added.

The use of carbodiimides as hydrolysis stabilizers is also known from EP 1 425 443, which discloses branched polyethylene terephthalate mono-fibers and/or filaments. One feature of EP 1 425 443 is directed at the branched-chain polyethylene terephthalates being stabilized by an effective amount of a hydrolysis stabilizer additive which also are present in the form of mono-filaments. These hydrolysis stabilizer additives undergo a chemical reaction with the terminal carboxyl groups.

A further hydrolysis stabilizer is described in JP 2006249152 A. Here, a stabilizer is concerned that is present in a resin that can be decomposed biologically.

A further hydrolysis stabilizer is mentioned in JP 2004277931 A; herein also a carbodiimide compound is concerned that undergoes a reaction with the terminal carboxyl groups of a polymer fiber. GB 1 485 294 also refers to polyester filaments and/or a method for the production thereof, whereby, as before, it is essential that stability of the fibers against hydrolysis is provided, for which purpose a carbodiimide stabilizer is allowed to undergo a reaction with the carboxyl groups of the starting resin.

Finally, WO 03/010370 also relates to stabilized polymer compositions and mono-filaments that are made from them and are stabilized against hydrolysis. Again, the stabilizer is a monomeric or polymeric carbodiimide.

Especially carbodiimide stabilizers are disadvantageous in that the product bakes together after some period of storage such that the further processing is made significantly more difficult and the quality of the product is affected adversely. Excipients have been added, such as, e.g., silica dust (Aerosil®), in order to overcome this problem, but this is undesirable since the excipients also end up in the finished product.

SUMMARY OF PREFERRED EMBODIMENTS

Starting from the stated prior art, the present invention is based on the object to create an improved method for providing free-flowing additive compounds, and to create free-flowing additive compounds.

This object is met by a method comprising the steps of:
preparation of a particulate additive compound;
storage of a mass of the particulate additive compound at a surface pressure of at least 30 g/cm$^2$ until the mass of additive compound is baked together;
crushing of the baked-together mass of the additive compound into a crushed particulate additive compound;
sieving of the crushed particulate additive compound, whereby particles of a size in excess of 4.0 mm and particles of a size of less than 0.1 mm are separated from the crushed particulate additive compound;

such that a free-flowing additive compound with long-term stability is obtained. The object is also met by creating a free-flowing additive compound that can be obtained from a baked-together, disintegrated, and screened additive compound.

It is preferable according to the invention to store a mass of additive particles, which was first produced according to generally known methods, for a period of 5 to 30 days, in particular 7 to 21 days, exposed to a weight load until the particles bake together. The storage is advantageously performed under pressure since this reduces the storage period required. The baked-together additive cake produced from these particles is then subjected to crushing. Crushing of the particles stored for this period of time surprisingly leads to particles which, after screening out crystal sizes of less than 0.1 mm and in excess of 4 mm, are kept upon further storage without again baking together inseparably.

Further exemplary embodiments relate to crushing the crystals after storage and fractioning them by means of a sieving procedure and recycling the sieved fractions into the procedure.

Another embodiment of the method relates to defined grain sizes being provided by means of fractionation.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
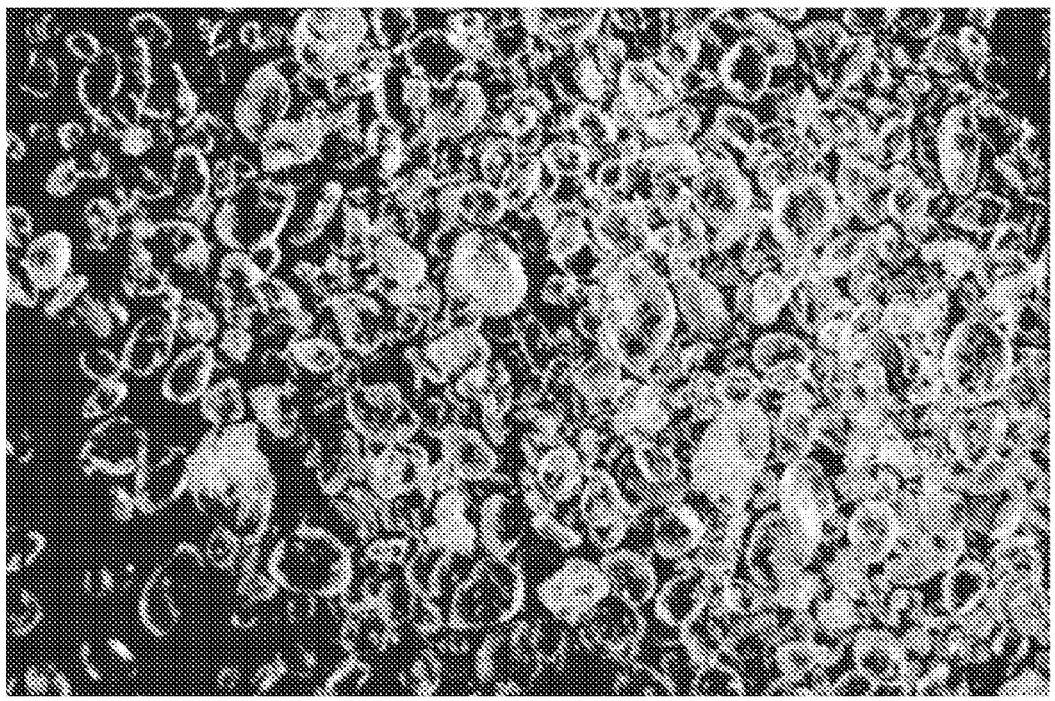
FIG. 1 shows stabilizer crystals that were obtained using methods according to the invention.

The method according to the invention allows the production of free-flowing additive compounds. It comprises, as a first step, the production of a particulate additive compound. This compound is produced in generally known fashion.

The carbodiimides are produced, for example, as described in DE 1156401 and EP 0609698. Accordingly, the following procedural steps are performed for the production of, for example, bis-(2,6-diisopropylenephenyl)-carbodiimide:

providing of 2,6-diisopropylphenylisocyanate in a suitable solvent, e.g. m-xylene addition of a suitable catalyst, e.g. as described in U.S. Pat. No. 2,853,473 heating and formation of the carbodiimide cooling the solution transfer into a precipitating agent and crystallization cooling the suspension separation of the solid substance drying.

The additive compound is a carbodiimide compound that is solid at room temperature, preferably an alkyl-substituted bis-aryl-carbodiimide and in particular bis-(2,6-diisopropylenephenyl)-carbodiimide. Especially the latter compound, once produced according to the prior art, tends to bake together intensively after short storage such that the particles form a firm, baked-together cake that can hardly be processed any further. Although the product is free-flowing right after it is produced, it bakes together so firmly within a few days, or within a few weeks in any case, that considerable forces are needed to crush the cake, whereby the original particle sizes are not retrieved. These disadvantageous properties of the product result in including melting of the solid and costly liquid dosing for technical application. However, the melting causes the product quality to deteriorate. Isocyanates are formed in the process, which necessitates special measures upon application due to reasons of environmental and, especially, occupational protection.

The further step of the method according to the invention comprises the storage of a mass of the particulate additive compound at a surface pressure of at least 30 g/cm² until the mass of additive compound has baked together into a cake of additive. In this context, mass is understood to mean a substantial amount of the additive compound, usually on the order of at least several hundred grams. The baking-together occurred inevitably during the storage of the product in the production methods used thus far. Typically, a mass of particles and/or crystals is stored that is on the order of several hundred grams to many kilograms, for example 10 to 20 kg, whereby this "mass" is advantageously packaged in bags or sacks of common sizes or common big-bags. It is preferred according to the invention to largely exclude the entry of air and, in particular, humidity during storage.

The packaged mass can advantageously be placed between plates or weights in order to form a baked-together, flattened mass. The "flattened baked-together mass" is generated, depending on weight load and/or pressure, during a storage period of 5 days to 30 days, preferably 7 to 21 days, and particularly preferred 10 to 14 days. With this storage period, a surface pressure of 30 g/cm² is sufficient in order to complete the process of baking-together.

Subsequently, the baked-together mass is subjected to crushing. This can be effected, e.g., by breaking and/or grinding, though other procedures are obviously also conceivable. Crushing converts the baked-together mass into a crushed particulate additive compound.

It is advantageous to then separate, e.g. by screening, particles of a size in excess of 4.0 mm, preferably in excess of 3.0 mm, particularly preferred in excess of 2.0 mm, and particles of a size of less than 0.1 mm, preferably of less than 0.2 mm. Obviously, this separation process can be continued until only particles of one or multiple defined grain size(s) remain. Accordingly, one fraction or multiple fractions of particles, as can be set, of a free-flowing additive compound with long-term stability remain(s).

According to the invention, the particle size distribution, determined, for example, using a Mastersizer 2000 (Malvern Instruments) at a pressure of 4 bar and a concentration of 0.0012 vol.-%, should be as follows: $d_{0.1} \geqq 6$ μm, preferably $\geqq 7$ μm and/or $d_{0.5} \geqq 50$ μm, preferably $\geqq 60$ μm, particularly preferred $\geqq 70$ μm and/or $d_{0.9} \geqq 250$ μm, preferred $\geqq 300$ μm, particularly preferred $\geqq 350$ μm. Most important in this context is the reduction of the fraction of fine particles; ideally, no more than 1.5 vol.-% of the particles should be of a size of less than 5 μm, preferably no more than 1.3 vol.-%. The upper limit results from practical considerations since the homogenization of the additive in the polymer becomes more difficult if the particles get to be too large. The upper limit is insignificant for the baking-together.

The free-flowing additive compounds thus produced can usually be stored for at least 2 months, in particular at least 4 months, and usually for at least 6 months, without baking together again. Moreover, this can be attained without having to add excipients which often have an adverse effect on a product in which the additive is used.

The storage described above can preferably be effected in the dark and while excluding humidity before the aged additive is crushed and ground and the previously compactly baked-together material is disintegrated into particles of different sizes which can then be separated into fractions by screening.

The fractions that are removed by sieving are preferably recycled into the process. In this context, the fine fractions, having a screen size of less than 0.1 and/or 0.2 mm, are to be recycled back into the storage step while the coarse fractions, screen size in excess of 4 mm or in excess of 3 mm or in excess of 2 mm are to be recycled back into the disintegration step.

In this context, it is important for a free-flowing additive compound according to the invention that the fine fraction is separated by sieving, whereby the particles belonging to the fine fraction have a size of less than 0.1 or less than 0.2 mm. The particles belonging to the fine fraction can account for a total fraction of approx. 30% of the total quantity of crushed stabilizer substance. Moreover, it is preferred to separate the coarse fractions, whereby particles of sizes in excess of 4.0 mm or in excess of 3.0 mm or in excess of 2.0 mm are considered to be the coarse fractions. Preferably, no excipients are added to the fraction thus obtained, which is advantageous in order to preserve the quality of subsequently produced products.

Figure 2:
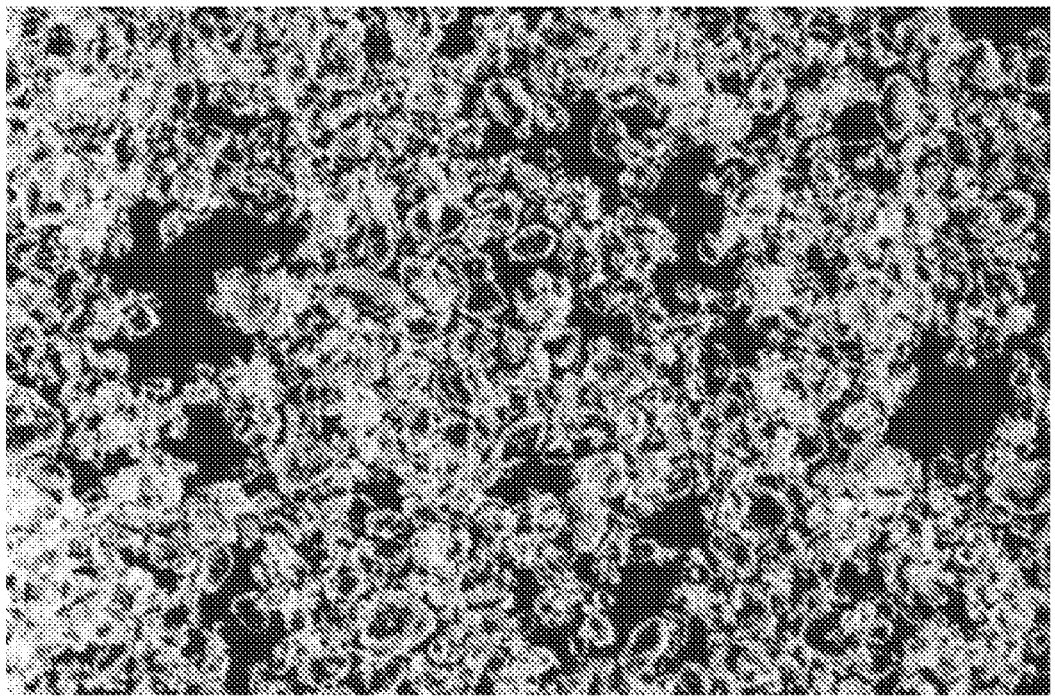
FIG. 2 shows stabilizer crystals that were obtained using a method according to the prior art.
Figure 3:
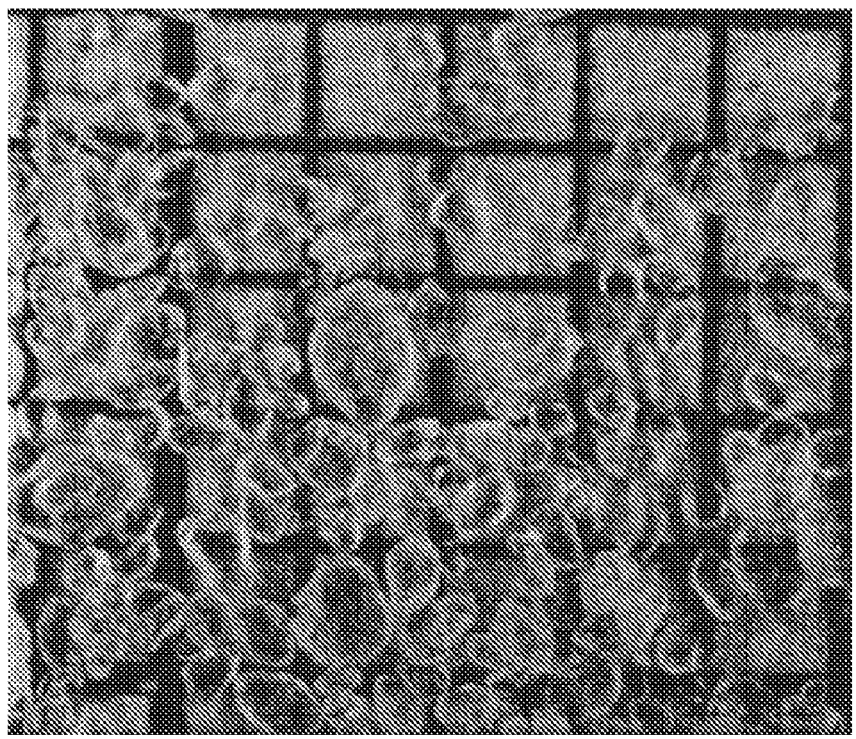
FIG. 3 shows stabilizer crystals that were obtained using the method according to the invention.
Figure 4:
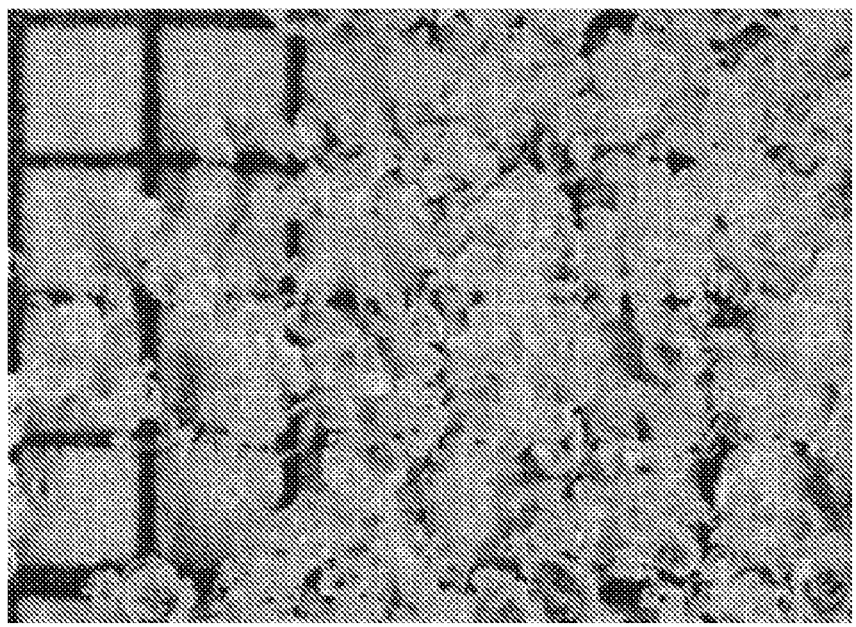
FIG. 4 shows stabilizer crystals that were obtained using a method according to the prior art.
Figure 5:
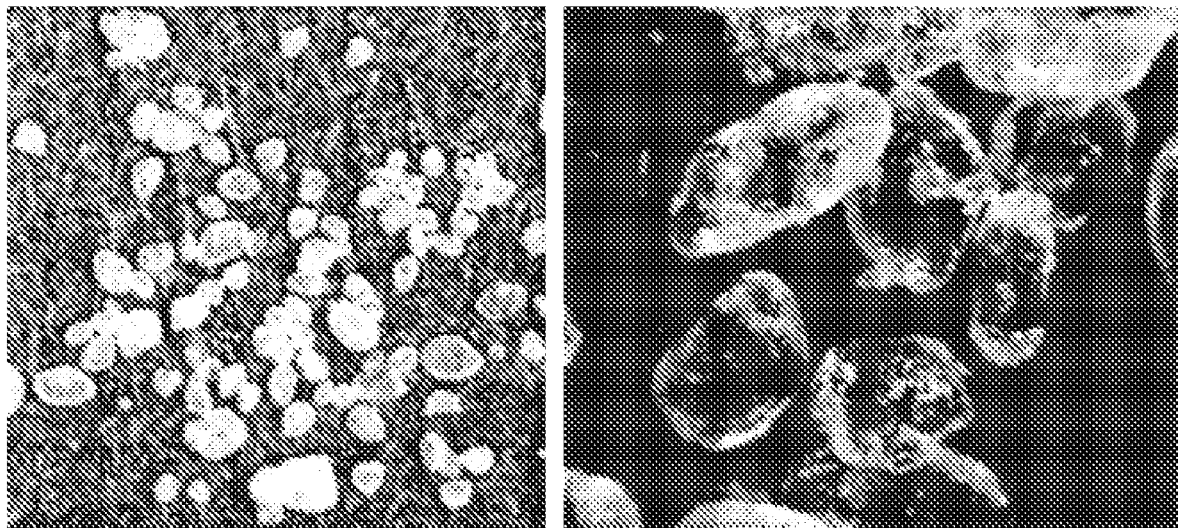
FIG. 5 shows stabilizer crystals that were obtained using the method according to the invention.
Figure 6:
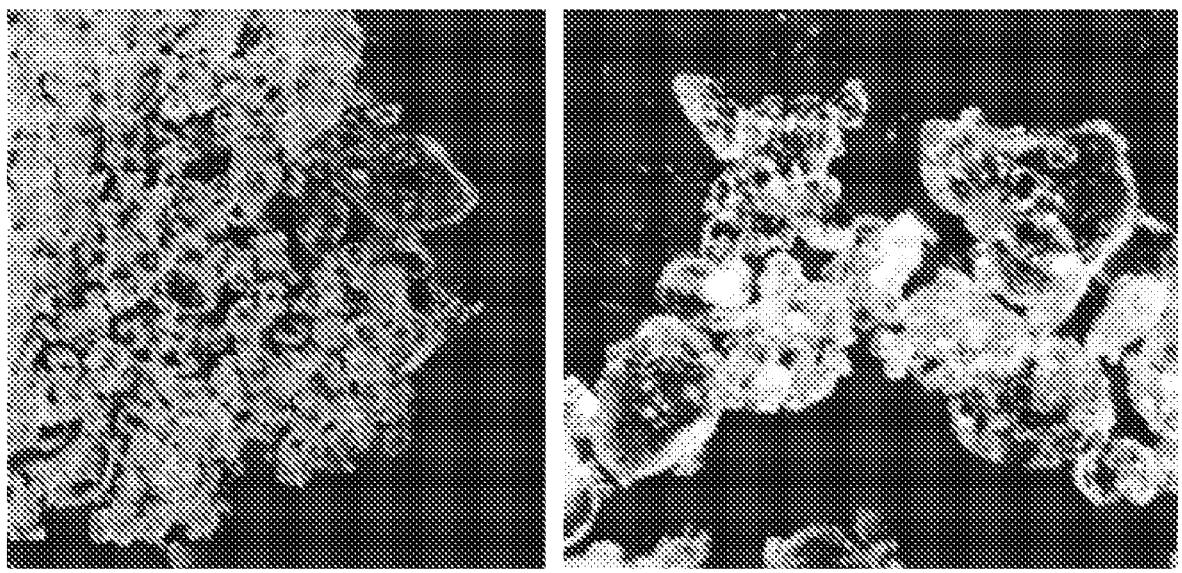
FIG. 6 shows stabilizer crystals that were obtained using a method according to the prior art.

FIGS. 1 to 6 show micrographs of bis-(2,6-diisopropylphenyl)-carbodiimide, whereby FIGS. 1, 3, and 5 show product obtained according to the invention, and FIGS. 2, 4, and 6 show conventional product after production and storage but without crushing. It is clearly evident that the particles that were crushed and sieved after storage have more spherical contours, whereby the particles according to the invention, in addition, do not adhere to each other.

The additive particles that can be obtained according to the invention by storage, crushing, and sieving, can advantageously be stored further in separated fractions without baking together again. The method according to the invention advantageously does without the use of excipients, such as, for example, Aerosil®, altogether such that the stabilizer can be added to additional processes without the quality of a subsequently produced product being adversely affected by addition of excipients. The procedural step of crushing after a defined aging period of 7 to 21 days provides particles having a morphology that is particularly evident from FIG. 5. The particles are rounded on their edges and obviously have a surface of a nature that shows no tendency to bake together with neighboring particles.

In contrast, the conventional particles bake together as is evident from FIGS. 2, 4, and 6. Moreover, the baked-together particles cannot easily be separated from each other: after as little as two weeks of storage, manual force is insufficient, and tools need to be used, for this purpose. In this context, disintegration leads to particles with very inhomogeneous grain size. Accordingly, sufficient separation of the baked-together particles will not be attainable in the normal processing process either.

In contrast, the crystals crushed in the method according to the invention remain loose and free-flowing and can therefore be used in subsequent processes even after an extended period of storage.

EXAMPLES

Example 1

Laboratory experiments on the additives according to the invention, divided into two samples, have resulted in the following with regard to the fine fractions of less than 0.2 mm size (sample 2) and the coarser fractions of a size in excess of 0.2 mm (sample 1):

For sample 1, 177.6 g of a sieved, grainy, free-flowing stabilizer 7000 (made by Raschig GmbH), a carbodiimide, having coarse graining in excess of 0.2 mm were placed in a flat plastic bag and a flat "plate" of 14 cm×11 cm was formed. This sample was placed on a tile 24 cm×12 cm in size and covered by another plate. The sample between the two plates was weighted down by a mass. Sample 1 was placed on a tile of 1165 g and then the sample was weighted down with a mass of 5095 g. The resulting surface pressure was 40.6 g/cm². The sample was stored in a climatic test cabinet at 40° C. and 75% humidity.

After a storage period of 16 days, the sample, which had been produced from material that was crushed and sieved according to the invention after an aging period of 7 days before it was formed into the plate and weighted down, showed to have the mobility and free-flowing ability of the individual particles of the sample after the mass weighting it down was removed.

As before, storage for another period of 21 days, also at 40° C. and 75% humidity, did not lead to an ultimate baking-together of the particles, rather it was feasible to dissociate the particles of the "pellet" from each other by mildly moving the sample with no exertion of force such that the stabilizer stored in this manner was easy to restore to its free-flowing configuration with no application of force.

Sample 2 of stabilizer 7000, having a total mass of 122.8 g, consisted of the fine fractions less than 0.2 mm in size that had been separated by sieving and appeared as powdered sugar. Sample 2 was also placed in a flat plastic bag and formed into a plate of identical size as sample 1. Sample 2 was weighted down by a mass of 4243 g and this resulted in a surface pressure of 35.1 g/cm². The sample was also stored in a climatic test cabinet at 40° C. and 75% humidity. After 16 days, the sample was already baked together completely and showed a crushing behavior like a cookie such that no defined grain sizes were obtained. Further storage for 21 days led to the formation of a plate that could be crushed using considerable force, but did no longer form free-flowing crystalline particles. Large numbers of neighboring particles had baked together, whereby the baking together of a non-definable number of particles into a large particle led to a homogeneous grain size being obtainable after disintegration of the plate that had ultimately baked together.

The experiment shows that stabilizer having particles of a certain grain size is obtained by defined crushing after a defined aging phase, in combination with appropriate sieving to remove at least the fine fractions and optionally the coarse fractions, and said stabilizer can be stored without permanently baking-together, which, otherwise occurs to stabilizers, or additives, of the same chemical composition that are not crushed after the time of aging according to the invention and are not fractioned after disintegration.

Example 2

Figure 7:
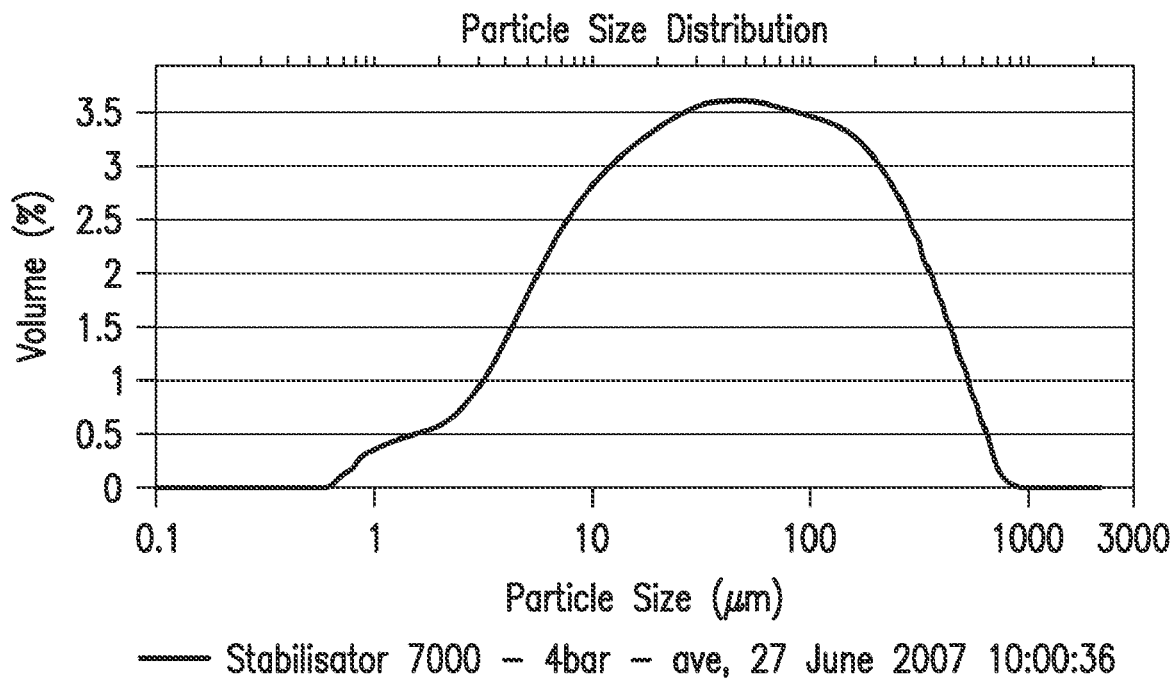
FIG. 7 shows the particle size distribution of a hydrolysis stabilizer according to the prior art.
Figure 8:
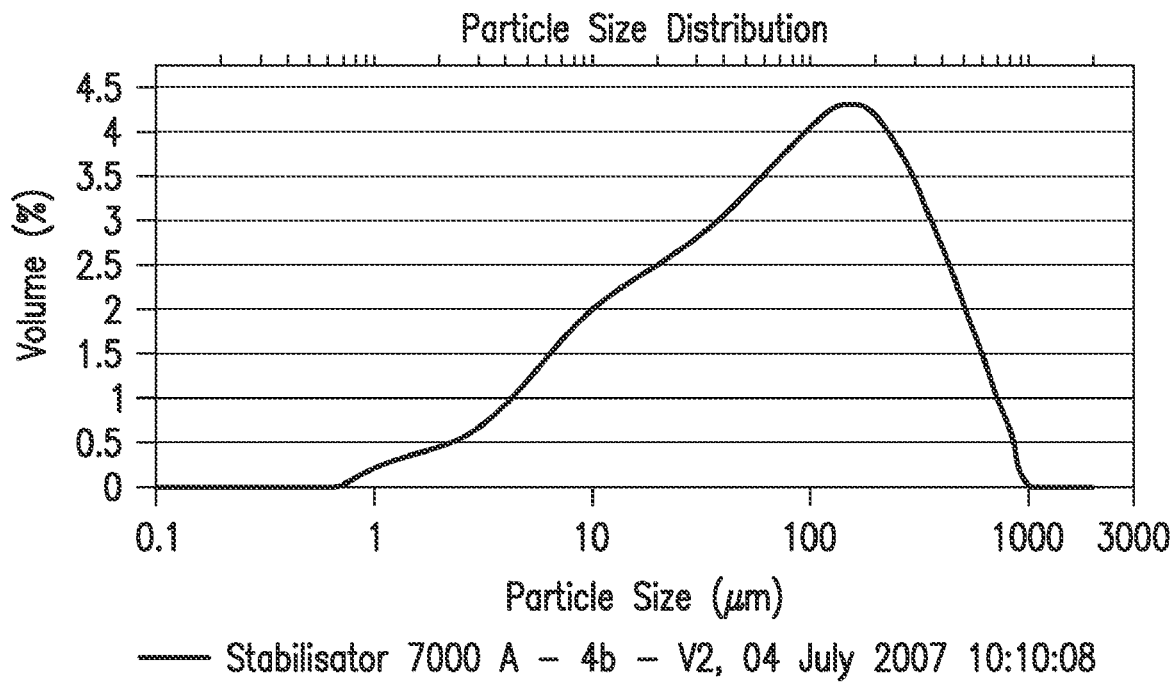
FIG. 8 shows the particle size distribution of a hydrolysis stabilizer according to the invention.

Stabilizer 7000 and stabilizer 7000 A, the latter being produced according to the method according to the invention and having particles of a size of less than 0.2 mm and in excess of 2.0 mm removed by screening, were tested at a pressure of 4 bar and a concentration of 0.0012 vol.-% using a particle size measuring device working on a laser diffraction based method (Mastersizer 2000, Malvern Instruments). The particle size distributions shown in FIGS. 7 and 8 were obtained. The stabilizer 7000 according to the prior art (FIG. 7) had the following particle size distribution: $d_{0.5}=40$ μm, $d_{0.9}=247$ μm, and $d_{0.1}=5$ μm. The resulting particle size distribution of the stabilizer 7000 (FIG. 8) according to the invention was as follows: $d_{0.5}=77$ μm, $d_{0.9}=362$ μm, and $d_{0.1}=8$ μm. It is essential in this context that, according to the invention, the particle size distribution is clearly shifted towards larger particles and, in particular, the fraction of particles smaller than 5 μm is reduced. It is evident that the sieving did not remove all particles smaller than 0.2 mm, but the reduction that was attained suffices already. For simplicity, in the present invention, a fraction shall be named (in some cases) according to the grain sizes theoretically resulting from the screening process, whereby the "sizes" refer to the screen rather than the particle size as measured.

Example 3

In a further experiment, stabilizer 7000 was sieved directly without prior storage and crushing. In the process, particles of a size in excess of 2.0 mm and particles of a size of less than 0.2 mm were separated. In the experiment, 200.0 g untreated stabilizer 7000 were placed on a combination of 2.0 mm and 0.2 mm screens and subjected to screening. The following screening fractions were obtained in the process:

| Fraction | Amount | Mass fraction |
|---|---|---|
| larger than 2.0 mm | 53.7 g | 26.9% |
| 0.2-2.0 mm | 94.1 g | 47.1% |
| smaller than 0.2 mm | 50.5 g | 25.2% |

The resulting screening loss is 1.7 g or 0.8%. The desired fraction is clearly smaller than with the material obtained according to the invention.

A sample of 50.0 g of the fraction containing particles from 0.2 mm to 2.0 mm in size was placed in a plastic bag and a flat "plate" of 10 cm×10 cm was formed. This sample was placed on a tile of 24 cm×12 cm in size and covered by another plate. The sample between the two plates was weighted down by a total mass of 3564 g. The resulting surface pressure was 35.6 g/cm². The sample was stored under ambient conditions.

After the mass used for weighting down was removed after a storage period of 10 days, the sample still showed some residual mobility and free-flowing capability of the individual particles of the sample, but was clearly baked-together as compared to sample 1 from example 1.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. Method for the production of free-flowing carbodiimide compounds, comprising the steps of:
    preparation of a particulate solid carbodiimide compound;
    storage of a mass of the particulate carbodiimide compound at a surface pressure of at least 30 g/cm² until the mass of the carbodiimide compound is baked together;
    crushing of the baked-together mass of the carbodiimide compound into a crushed particulate carbodiimide compound;
    sieving of the crushed particulate carbodiimide compound, whereby particles of a size in excess of 4.0 mm and particles of a size of less than 0.1 mm are separated from the crushed particulate carbodiimide compound such that a fraction containing particles of a free-flowing carbodiimide compound with long-term stability is obtained.

2. Method according to claim 1, wherein the storage period is 5 to 30 days.

3. Method according to claim 1, wherein the free-flowing carbodiimides are bis-(alkylphenyl)-carbodiimide compounds.

4. Method according to claim 3, wherein the carbodiimide compound is a bis-(2,6-diisopropylenephenyl)-carbodiimide.

5. Method according to claim 1, wherein particles of a size in excess of 3.0 mm, and particles of a size of less than 0.2 mm are removed from the disintegrated particulate carbodiimide compound by screening.

6. Method according to claim 1, wherein the sieving is continued until particles having one grain size or a grain size from 0.2 mm to 2 mm remain.

7. Method according to claim 1, wherein the particles have the following particle size distribution (determined using Mastersizer 2000, Malvern Instruments, at a pressure of 4 bar and a concentration of 0.0012 vol.-%): $d_{0.1} \leqq 6$ µm, and/or $d_{0.5} \leqq 50$ µm, and/or $d_{0.9} \leqq 250$ µm.

8. Method according to claim 1, wherein the free-flowing carbodiimide compound can be stored for at least 2 months without baking together.

9. Method according to claim 1, wherein the free-flowing carbodiimide compound can be stored in free-flowing condition without any excipients.

10. Method according to claim 2, wherein the storage period is 7 to 21 days.

11. Method according to claim 10, wherein the storage period is 10 to 14 days.

12. Method according to claim 5, wherein particles of a size in excess of 2.0 mm are removed from the disintegrated particulate carbodiimide compound by screening.

13. Method according to claim 1, wherein the particles have the following particle size distribution (determined using Mastersizer 2000, Malvern Instruments, at a pressure of 4 bar and a concentration of 0.0012 vol.-%): $d_{0.1} \leqq 6$ µm and/or $d_{0.5} \leqq 60$ µm and/or $d_{0.9} \leqq 300$ µm.

14. Method according to claim 1, wherein the particles have the following particle size distribution (determined using Mastersizer 2000, Malvern Instruments, at a pressure of 4 bar and a concentration of 0.0012 vol.-%): $d_{0.1} \leqq 7$ µm and/or $d_{0.5} \leqq 70$ µm and/or $d_{0.9} \leqq 350$ µm.

* * * * *